(12) United States Patent
Chen (10) Patent No.: US 11,231,565 B2
(45) Date of Patent: Jan. 25, 2022

(54) OPTICAL LENS COMPRISING EIGHT LENSES OF −−++−++− REFRACTIVE POWERS

(71) Applicant: ABILITY ENTERPRISE CO., LTD., New Taipei (TW)

(72) Inventor: Chia-Hung Chen, New Taipei (TW)

(73) Assignee: ABILITY ENTERPRISE CO., LTD.

( * ) Notice: Subject to any disclaimer, the term of this patent is extended or adjusted under 35 U.S.C. 154(b) by 141 days.

(21) Appl. No.: 16/528,404

(22) Filed: Jul. 31, 2019

(65) Prior Publication Data

US 2020/0073092 A1 Mar. 5, 2020

(30) Foreign Application Priority Data

Aug. 31, 2018 (TW) ................. 107130703

(51) Int. Cl.
*G02B 13/06* (2006.01)
*G02B 13/18* (2006.01)
*G02B 9/64* (2006.01)

(52) U.S. Cl.
CPC ............... *G02B 13/06* (2013.01); *G02B 9/64* (2013.01); *G02B 13/18* (2013.01)

(58) Field of Classification Search
CPC .......... G02B 13/06; G02B 13/18; G02B 9/64
See application file for complete search history.

(56) References Cited

U.S. PATENT DOCUMENTS

2007/0242366 A1 10/2007 Saito
2009/0015694 A1 1/2009 Saito
2011/0235519 A1 9/2011 Racz et al.
2017/0192200 A1* 7/2017 Hsieh ................. G02B 13/0045
2017/0293120 A1 10/2017 Tashiro
(Continued)

FOREIGN PATENT DOCUMENTS

CN 1515921 A 7/2004
CN 106249392 A 12/2016
(Continued)

OTHER PUBLICATIONS

Communication corresponding to Chinese Application No. 201811023820.7 and issued by the China National Intellectual Property Administration dated May 11, 2021, 12 pages.
(Continued)

*Primary Examiner* — Wen Huang
(74) *Attorney, Agent, or Firm* — Innovation Counsel LLP (57) ABSTRACT

An optical lens, in order from an object side to an image-forming side, includes: a first lens, a second lens, a third lens, a fourth lens, a fifth lens, a sixth lens, a seventh lens and an eighth lens, respectively having negative, negative, positive, positive, negative, positive, positive and negative refractive power. The curvature radius of the object-side surface of the first lens is greater than the curvature radius of the image-side surface of the first lens; the image-side surface of the eighth lens has an effective radius r and a vertex point, H is a distance between the vertex point and the optical axis, the image-side surface of the eighth lens intersects with the optical axis at an intersection point, d is a distance between a projected position of the vertex point on the optical axis and the intersection point, and $|r/d| \leq 30$ and/or $|r/H| \leq 2$.

20 Claims, 4 Drawing Sheets

(56) References Cited

U.S. PATENT DOCUMENTS

2017/0329108 A1    11/2017  Hasimoto
2020/0012078 A1*    1/2020  Kuo .................. G02B 13/0045
2021/0080693 A1*    3/2021  Asami .................... G02B 13/18

FOREIGN PATENT DOCUMENTS

| | | |
|---|---|---|
| CN | 110412728 A | 11/2019 |
| JP | H0593866 A | 4/1993 |
| JP | H07294808 A | 11/1995 |
| JP | 3491578 B2 | 1/2004 |
| JP | 2018025579 A | 2/2018 |
| JP | 2018072640 A | 5/2018 |
| TW | I553341 B | 10/2016 |
| TW | 202006418 A | 2/2020 |
| WO | 2012026069 A1 | 3/2012 |
| WO | 2015016004 A1 | 2/2015 |

OTHER PUBLICATIONS

Communication corresponding to Taiwan Application No. 107130703 and issued by Taiwan Intellectual Property Office dated Aug. 25, 2021, 9 pages.

\* cited by examiner

FIG. 1

| Lens | Surface number | Curvature radius (mm) | Thickness (mm) | Refractive index | Abbe number | Effective diameter | Conic constant |
|---|---|---|---|---|---|---|---|
| L1 | S1 | 9.1 | 0.6 | 1.8 | 40 | 10.92 | 0.00 |
|  | S2 | 3.3 | 1.8 |  |  | 5.92 | 0.00 |
| L2 | S3 | 5.0 | 0.9 | 1.5 | 55 | 5.92 | -15.00 |
|  | S4 | 1.2 | 1.5 |  |  | 3.42 | -1.20 |
| L3 | S5 | 6.2 | 1.7 | 1.9 | 35 | 5.60 | 0.00 |
|  | S6 | -6.2 | 0.3 |  |  | 5.60 | 0.00 |
|  | STO | ∞ | 0.0 |  |  | 1.71 | 0.00 |
| L4 | S7 | 3.4 | 0.9 | 1.5 | 55 | 2.02 | 8.50 |
|  | S8 | -2.3 | 0.1 |  |  | 2.34 | -19.00 |
| L5 | S9 | -3.8 | 0.4 | 1.6 | 20 | 2.38 | -60.00 |
|  | S10 | 2.4 | 0.1 |  |  | 2.59 | 0.00 |
| L6 | S11 | 3.9 | 0.9 | 1.5 | 55 | 2.63 | 0.00 |
|  | S12 | -1.8 | 0.1 |  |  | 2.74 | 0.00 |
| L7 | S13 | 8.8 | 0.7 | 1.5 | 55 | 2.86 | -6.00 |
|  | S14 | -14.4 | 0.1 |  |  | 2.99 | 45.00 |
| L8 | S15 | 18.0 | 0.4 | 1.6 | 20 | 2.96 | -3.50 |
|  | S16 | 2.4 | 0.5 |  |  | 3.26 | -8.00 |
|  | S17 | ∞ | 0.21 | 1.5 | 65 | 6.34 | 0.00 |
|  | S18 | ∞ | 0.45 |  |  | 6.34 | 0.00 |
|  | IMA |  | 4.5 | 0 |  |  |  |

FIG. 2

| Surface number<br>Aspheric coefficient | S3 | S4 | S7 | S8 | S9 | S10 | S11 | S12 | S13 | S14 | S15 | S16 |
|---|---|---|---|---|---|---|---|---|---|---|---|---|
| A2 | 0 | 0 | 0 | 0 | 0 | 0 | 0 | 0 | 0 | 0 | 0 | 0 |
| A4 | -0.01165 | 0.02146 | -0.04324 | -0.18417 | -0.19301 | -0.04403 | 0.03224 | 0.06854 | -0.01638 | -0.05449 | -0.09189 | -0.04384 |
| A6 | 0.00087 | 0.00300 | -0.01582 | 0.08104 | 0.09614 | -0.00945 | -0.02689 | -0.01174 | -0.00482 | -0.00007 | 0.01381 | 0.01095 |
| A8 | 0.00003 | 0.00397 | -0.03407 | -0.04581 | -0.05428 | 0.01072 | 0.00901 | 0.01622 | -0.00154 | 0.00002 | -0.00243 | -0.00134 |
| A10 | -0.00001 | -0.00137 | 0.00827 | -0.03710 | -0.00223 | -0.00270 | -0.00147 | -0.00136 | 0.00030 | 0.00002 | 0.00038 | -0.00001 |
| A12 | 0 | -0.00038 | -0.01263 | 0.02003 | 0.00537 | -0.00196 | 0.00048 | -0.00021 | -0.00032 | 0.00012 | 0.00020 | -0.00003 |
| A14 | 0 | 0.00012 | -0.05757 | 0.01288 | 0.01569 | -0.00046 | 0.00029 | -0.00007 | 0.00005 | 0.00002 | -0.00005 | 0 |
| A16 | 0 | 0.00002 | 0.05392 | -0.00136 | 0.00088 | 0.00044 | -0.00075 | -0.00001 | 0.00010 | 0 | -0.00004 | 0 |

OPTICAL LENS COMPRISING EIGHT LENSES OF −−++−++− REFRACTIVE POWERS

This application claims the benefit of Taiwan application Serial No. 107130703, filed Aug. 31, 2018, the subject matter of which is incorporated by reference herein in its entirety.

TECHNICAL FIELD

The invention relates in general to an optical lens, and more particularly to an optical lens with low distortion, large aperture size and field of view, and compact volume.

BACKGROUND

In recent years, due to the rise of random photography activities in motion, the demand for a light and short optical lens has increased substantially, and the trend in a compact image capturing device with high-quality images has grown up. Such a type of device is mainly used for outdoor activities for real-time photography. The lens for this type of device requires a short total length and a ultra wide viewing angle.

The image capturing device generally used in a normal environment has low elasticity to modulate the camera parameters with the environment. For example, the problem of image quality of the image capturing device cannot be overcome since the change of refractive index of the environmental medium will have the viewing angle become smaller and the resolution be lowered. Thus, it is difficult for the image capturing device to achieve stable image quality and ultra wide viewing angle. Therefore, it is desired to provide a novel optical lens and an electronic device, which can maintain a certain resolution with environmental factors under the premise that the viewing angle is increased or substantially unchanged.

SUMMARY

In view of this, the present invention provides an optical lens. The optical lens, in order from an object side to an image-forming side, includes: a first lens, a second lens, a third lens, a fourth lens, a fifth lens, a sixth lens, a seventh lens and an eighth lens. The first lens has negative refractive power, the second lens has negative refractive power, the third lens has positive refractive power, the fourth lens has positive refractive power, the fifth lens has negative refractive power, the sixth lens has positive refractive power, the seventh lens has positive refractive power, and the eighth lens has negative refractive power.

The present invention further provides an optical lens. The optical lens, in order from an object side to an image-forming side, includes: a first lens, a second lens, a third lens, a fourth lens, a fifth lens, a sixth lens, a seventh lens and an eighth lens. The first lens has negative refractive power, and includes an object-side surface and an image-side surface. R1 is a curvature radius of the object-side surface, R2 is a curvature radius of the image-side surface, and $|R1/R2| \geq 1$. The second lens has refractive power, the third lens has positive refractive power, the fourth lens has positive refractive power, the fifth lens has negative refractive power, the sixth lens has positive refractive power, the seventh lens has positive refractive power, and the eighth lens has negative refractive power.

The present invention also provides an optical lens. The optical lens, in order from an object side to an image-forming side, includes: a first lens, a second lens, a third lens, a fourth lens, a fifth lens, a sixth lens, a seventh lens and an eighth lens. The first lens has negative refractive power, the second lens has refractive power, the third lens has positive refractive power, the fourth lens has positive refractive power, the fifth lens has negative refractive power, the sixth lens has positive refractive power, and the seventh lens has positive refractive power. In addition, the eighth lens includes an image-side surface with a vertex point, r is an effective radius of the image-side surface, the image-side surface intersects with the optical axis at an intersection point, H is a distance between the vertex point and the optical axis, the vertex point projects on the optical axis at a projection location, d is a distance between the projection location and the intersection point, and $|r/d| \leq 30$ and/or $|r/H| \leq 2$.

As stated above, the optical lens provided by the present invention features low distortion, large aperture size and field of view, compact volume and low cost.

DETAILED DESCRIPTION

A number of embodiments of the present invention are disclosed below with accompanying drawings. For the descriptions to be better understood, many details in practical application are disclosed below. However, a person ordinary skilled in the technology field will understand that in some embodiments of the present invention, these details in practical application are not necessary, and shall not be used to limit the scope of protection of the present invention. Furthermore, to simplify the accompanying drawings, some structures and elements are schematically illustrated in the accompanying drawings. Moreover, the same symbols in the different drawings may be regarded as the corresponding elements unless it is otherwise indicated. These drawings are drawn to clearly illustrate the connection among the various elements in these embodiments, and are not intended to depict the actual dimensions of the elements.

Figure 1:
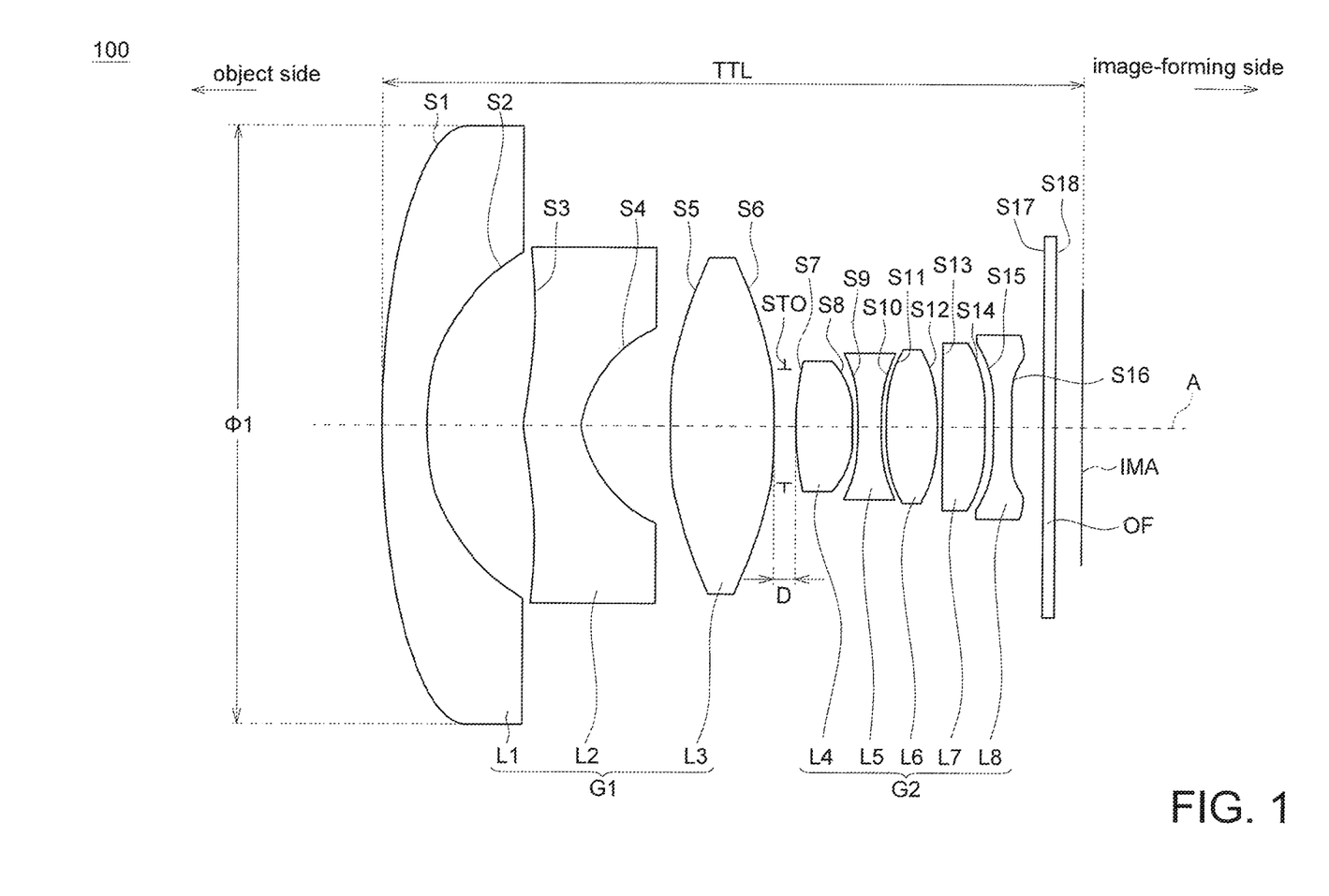
FIG. 1 shows a cross-sectional view of an optical lens according to one embodiment of the present invention.

FIG. 1 shows a cross-sectional view of an optical lens 100 according to one embodiment of the present invention. It only shows the optical structure inside the optical lens 100, and the rest of the structure which can be correspondingly designed by those skilled in the art is omitted. The optical lens 100 has the character of low distortion, large aperture size, large viewing angle, small size, and low cost, and may be applied to a device capable of image projection or image capture, the device including but not limited to a handheld communication system, an aerial camera, a sports camera lens, a camera lens for vehicle, a surveillance system, a digital camera, a digital video camera, a projector and so on.

In FIG. 1, the object side is on the left, and the image-forming side is on the right. The light beam penetrates the respective lenses in the optical lens 100 from the object side and is imaged on an imaging plane IMA on the image-forming side. In the present embodiment, the optical lens 100, in order from an object side to an image-forming side, includes a first lens L1, a second lens L2, a third lens L3, a fourth lens L4, a fifth lens L5, a sixth lens L6, a seventh lens L7 and an eighth lens L8. The above eight lenses may be arranged along an optical axis A. The first lens L1, the second lens L2, the third lens L3, the fourth lens L4, the fifth lens L5, the sixth lens L6, the seventh lens L7 and the eighth lens L8 may respectively have refractive power.

In one embodiment, the optical lens 100 has a first lens group G1 and a second lens group G2. The first lens group G1 and the second lens group G2 may respectively have refractive power. The first lens group G1 may include the first lens L1, the second lens L2 and the third lens L3, and the second lens group G2 may include the fourth lens L4, the fifth lens L5, the sixth lens L6, the seventh lens L7 and the eighth lens L8.

In one embodiment, the first lens L1, the second lens L2 and the third lens L3 as a whole have a positive first total refractive power, and the fourth lens L4, the fifth lens L5, the sixth lens L6, the seventh lens L7 and the eighth lens L8 as a whole have a positive second total refractive power. That is, both of the first lens group G1 and the second lens group G2 may have positive refractive power. In another embodiment, the first lens group G1 has refractive power larger than the second lens group G2. That is, the first lens group G1 has a better ability to converge the light beams. In addition, the first lens group G1 is closer to the object side. Therefore, the field of view (FOV) of the optical lens 100 is determined mainly by the first lens group G1.

In one embodiment, of eight lenses in the optical lens 100, four lenses may have positive refractive power, and the other four lenses may have negative refractive power. In another embodiment, the first lens L1 and the fifth lens L5 may have negative refractive power, the second lens L2, the seventh lens L7 and the eighth lens L8 may each have positive refractive power or negative refractive power, and the third lens L3, the fourth lens L4 and the sixth lens L6 may have positive refractive power. In still another embodiment, the second lens L2 may have negative refractive power, the seventh lens L7 may have positive refractive power, and/or the eighth lens L8 may have negative refractive power.

In one embodiment, R1 is a curvature radius of the object-side surface S1 of the first lens L1, R2 is a curvature radius of the image-side surface S2 of the first lens L1, and the first lens L1 satisfies the condition of $1 \leq |R1/R2|$.

In one embodiment, F is a focal length of the optical lens 100, and the optical lens 100 satisfies the condition of $1 \leq |F/D|$. D may be a distance between the first lens group G1 and the second lens group G2, or a distance between the image-side surface S6 of the third lens L3 and the object-side surface S7 of the fourth lens L4. In one specific embodiment, D is a distance between the image-side surface S6 and the object-side surface S7 in the optical axis A.

Moreover, in one embodiment, TTL is a total length of the optical lens 100, and $F/TTL \leq 0.5$. The total length may be defined as the distance between the object-side surface S1 of the first lens L1 and the imaging plane IMA.

In one embodiment, the optical lens 100 may converge the light beams incident from the object side onto the imaging plane IMA on the image-forming side. In condition that Y is an image height of an object on the imaging plane IMA, $F/Y \leq 1.5$.

In one embodiment, FOV is a field of view of the optical lens 100, and the optical lens 100 further includes a stop STO. FNO is F-number of the stop STO, and $0 \leq (FNO*TTL)/(FOV*Y)$ and/or $(FNO*TTL)/(FOV*Y) \leq 0.3$.

Furthermore, in one embodiment, the first lens L1 has a refractive index N1 and an Abbe number V1, the second lens L2 has a refractive index N2 and an Abbe number V2, the third lens L3 has a refractive index N3 and an Abbe number V3, the fourth lens L4 has a refractive index N4 and an Abbe number V4, the fifth lens L5 has a refractive index N5 and an Abbe number V5, the sixth lens L6 has a refractive index N6 and an Abbe number V6, the seventh lens L7 has a refractive index N7 and an Abbe number V7, the eighth lens L8 has a refractive index N8 and an Abbe number V8, and the optical lens 100 satisfies at least one of the following conditions: $N1 \geq N2$, $N1 \geq N4$, $N1 \geq N5$, $N1 \geq N6$, $N1 \geq N7$, $N1 \geq N8$, $N3 \geq N2$, $V2 \geq V1$, $V2 \geq V3$, $V4 \geq V1$, $V6 \geq V1$, $V7 \geq V1$, $V3 \geq V5$ and $V3 \geq V8$.

In one specific embodiment, the optical lens 100 satisfies at least one of the following conditions: $N1-N2 \geq 0.05$, $N1-N4 \geq 0.05$, $N1-N5 \geq 0.05$, $N1-N6 \geq 0.05$, $N1-N7 \geq 0.05$, $N1-N8 \geq 0.05$, $N3-N2 \geq 0.05$, $V2-V1 \geq 5$, $V2-V3 \geq 5$, $V4-V1 \geq 5$, $V6-V1 \geq 5$, $V7-V1 \geq 5$, $V3-V5 \geq 5$ and $V3-V8 \geq 5$.

Furthermore, in one embodiment, the first lens L1, the second lens L2, the third lens L3, the fourth lens L4, the fifth lens L5, the sixth lens L6, the seventh lens L7 and the eighth lens L8 may respectively be a glass lens made of glass material or a plastic lens made of plastic material. The material of the plastic lens may include, but not limited to, polycarbonate, cyclic olefin copolymer (e.g. APEL), polyester resins (e.g. OKP4 or OKP4HT) and so on, or a mixture and/or a compound material including at least one of the above-mentioned three materials. Specifically, in one embodiment, the first lens L1 and/or the third lens L3 are/is glass lens(es). In another embodiment, the second lens L2, the third lens L3, the fourth lens L4, the fifth lens L5, the sixth lens L6, the seventh lens L7 and the eighth lens L8 are respectively a plastic lens or a glass lens.

Besides, in one embodiment, at least two lenses of the second lens L2, the fourth lens L4, the sixth lens L6 and the seventh lens L7 may be made of the same kind of material, or of a material having the same refractive power and/or the same Abbe number. In another embodiment, the fifth lens L5 and the eighth lens L8 may be made of the same kind of material, or of a material having the same refractive power and/or the same Abbe number. In still another embodiment, at least two lenses of the second lens L2, the fourth lens L4, the sixth lens L6 and the seventh lens L7 may have the same refractive power and/or Abbe number, and/or the fifth lens L5 and the eighth lens L8 have the same refractive power and/or Abbe number.

Moreover, in one embodiment, the first lens L1, the second lens L2, the third lens L3, the fourth lens L4, the fifth lens L5, the sixth lens L6, the seventh lens L7 and the eighth lens L8 may respectively be a spherical lens, a free-form lens or an aspheric lens. In one embodiment, at least one of the second lens L2, the fourth lens L4, the fifth lens L5, the sixth lens L6, the seventh lens L7 and the eighth lens L8 is an aspheric lens or a free-form lens. In one specific embodiment, all of the second lens L2, the fourth lens L4, the fifth lens L5, the sixth lens L6, the seventh lens L7 and the eighth lens L8 are aspheric lenses.

Specifically, each of the free-form lenses has at least one free-form surface; that is, an object-side surface and/or an image-side surface of the free-form lens are/is the free-form surface(s). Each of the aspheric lenses has at least one aspheric surface; that is, an object-side surface and/or an image-side surface of the aspheric lens are/is the aspheric surface(s). And, each of the aspheric surfaces may satisfy the following mathematic equation:

$$Z = \left[\frac{(C^*Y^2)}{1+\sqrt{1-(K+1)C^2Y^2}}\right] + \sum(A_i^*Y^j)$$

where Z is the coordinate in the optical axis A direction, and the direction in which light propagates is designated as positive; $A_2, A_4, A_6, A_8, A_{10}, A_{12}, A_{14}$, and $A_{16}$ are aspheric coefficients; K is coefficient of quadratic surface; C is reciprocal of R (C=1/R); R is the radius of curvature; Y is the coordinate in a direction perpendicular to the optical axis A, in which the upward direction away from the optical axis A is designated as positive. In addition, each of the parameters or the coefficients of the equation of each of the aspheric lenses may be designated respectively to determine the focal length of each of the aspheric lenses.

Figure 2:
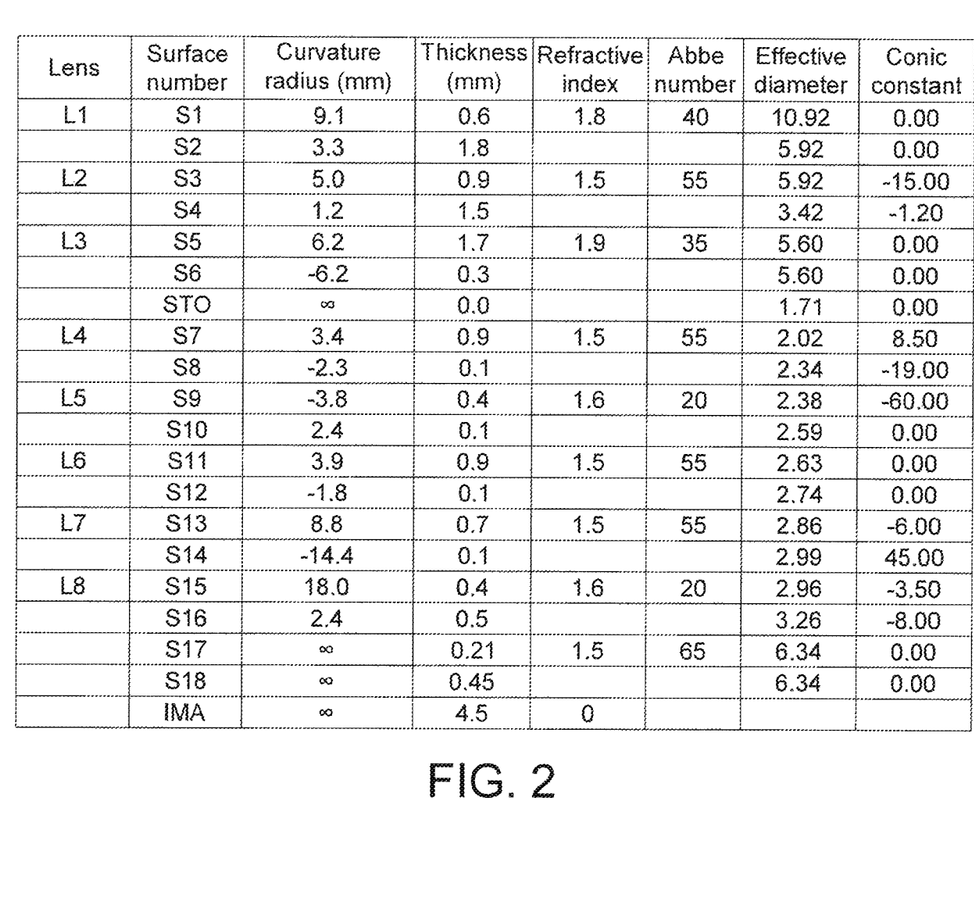
FIG. 2 shows each lens parameter of the optical lens of FIG. 1 according to one embodiment of the present invention.

FIG. 2 shows each lens parameter of the optical lens 100 of FIG. 1 according to one embodiment of the present invention, including the curvature radius, the thickness, the refractive index, the Abbe number (coefficient of chromatic dispersion), and so on of each of the lenses. The surface numbers of the lenses are sequentially ordered from the object side to the image-forming side. For example, "STO" stands for the stop STO, "S1" stands for the object-side surface S1 of the first lens L1, "S2" stands for the image-side surface S2 of the first lens L1, . . . , "S17" and "S18" respectively stand for the object-side surface S17 and the image-side surface S18 of the optical plate OF, and so on. In addition, the "thickness" stands for the distance between an indicated surface and an adjacent surface close to the image-forming side. For example, the "thickness" of the object-side surface S1 is the distance between the object-side surface S1 and the image-side surface S2; the "thickness" of the image-side surface S2 is the distance between the image-side surface S2 and the object-side surface S3 of the second lens L2.

Figure 3:
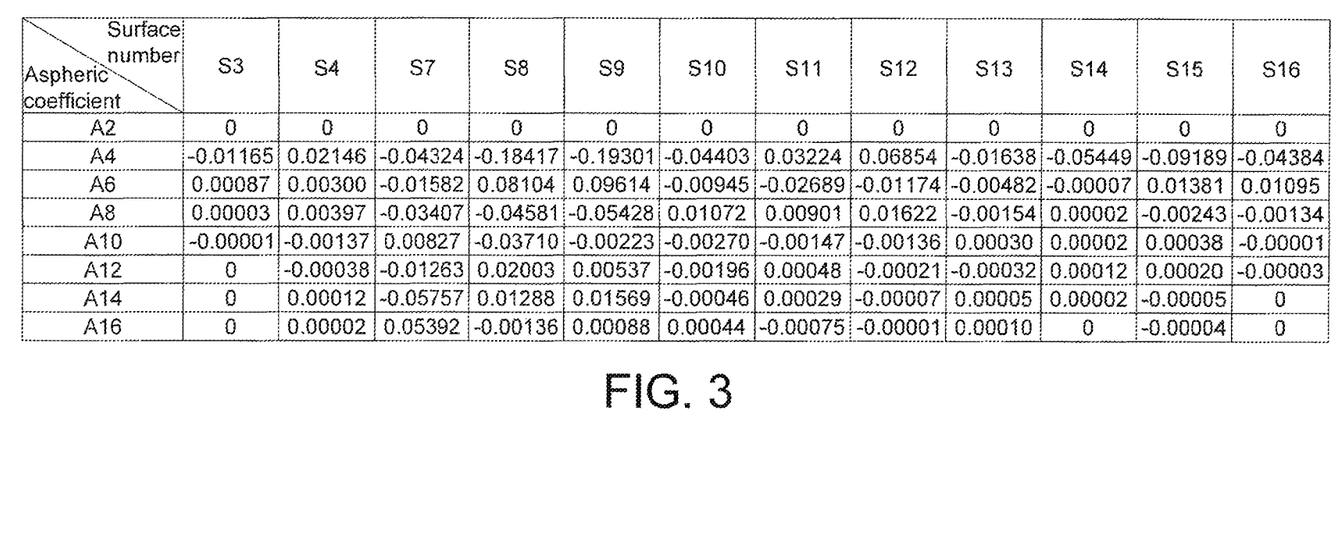
FIG. 3 lists aspheric coefficients of the mathematic equation of the aspheric lenses of the optical lens of FIG. 1 according to one embodiment of the present invention.

FIG. 3 lists aspheric coefficients of the mathematic equation of the aspheric lenses of the optical lens 100 of FIG. 1 according to one embodiment of the present invention. If the object-side surfaces S3, S7, S9, S11, S13, S15 and the image-side surfaces S4, S8, S10, S12, S14, S16 are respectively aspheric surfaces, each of the aspheric coefficients for the mathematic equation of the aspheric lenses may be listed as indicated in FIG. 3.

Referring to FIG. 1 to FIG. 3, the object-side surface S1 and the image-side surface S2 of the first lens L1 may both have positive refractive rate. The object-side surface S1 may be a convex surface convex toward the object side, and the image-side surface S2 may be a concave surface concave toward the object side. Further, the first lens L1 may be a lens having negative refractive power, the lens including but not limited to any one of a convex-concave lens, glass or plastic lens, and a spherical or aspheric lens having negative refractive power, or a combination thereof. Furthermore, the first object-side surface S1 convex toward the object side may contribute to the first lens L1 having a larger convergence angle. In the present embodiment, the field of view FOV of the optical lens 100 ranges from about 200° to about 220°. On the other hand, the first lens L1 may have a larger effective diameter Φ1 so that the amount of light received by the optical lens 100 is increased. In the present embodiment, the effective diameter Φ1≥8 cm.

The object-side surface S3 and the image-side surface S4 of the second lens L2 may both have positive refractive rate.

The object-side surface S3 may be a surface convex toward the object side at the optical axis A, and the image-side surface S4 may be a concave surface concave toward the object side. Further, the second lens L2 may be a lens having refractive power, the lens including but not limited to any one of a concave lens, glass or plastic lens, and a spherical or aspheric lens having negative refractive power or positive refractive power, or a combination thereof.

The object-side surfaces S5, S7, S11, S13 of the third lens L3, the fourth lens L4, the sixth lens L6 and the seventh lens L7 may all have positive refractive rate, the image-side surfaces S6, S8, S12, S14 of the third lens L3, the fourth lens L4, the sixth lens L6 and the seventh lens L7 may all have negative refractive rate. The object-side surfaces S5, S7, S11, S13 may be convex surfaces convex toward the object side, and the image-side surfaces S6, S8, S12, S14 may be convex surfaces convex toward the image-forming side. Further, the third lens L3, the fourth lens L4, the sixth lens L6 and the seventh lens L7 may respectively be a lens having positive refractive power, the lens including but not limited to any one of a biconvex lens, glass or plastic lens, and a spherical or aspheric lens having positive refractive power, or a combination thereof.

The object-side surface S9 of the fifth lens L5 may have negative refractive rate, and the image-side surface S10 may have positive refractive rate. The object-side surface S9 may be a concave surface concave toward the image-forming side, and the image-side surface S10 may be a concave surface concave toward the object side. Further, the fifth lens L5 may be a lens having negative refractive power, the lens including but not limited to any one of a biconcave lens, glass or plastic lens, and a spherical or aspheric lens having negative refractive power, or a combination thereof.

Figure 4:
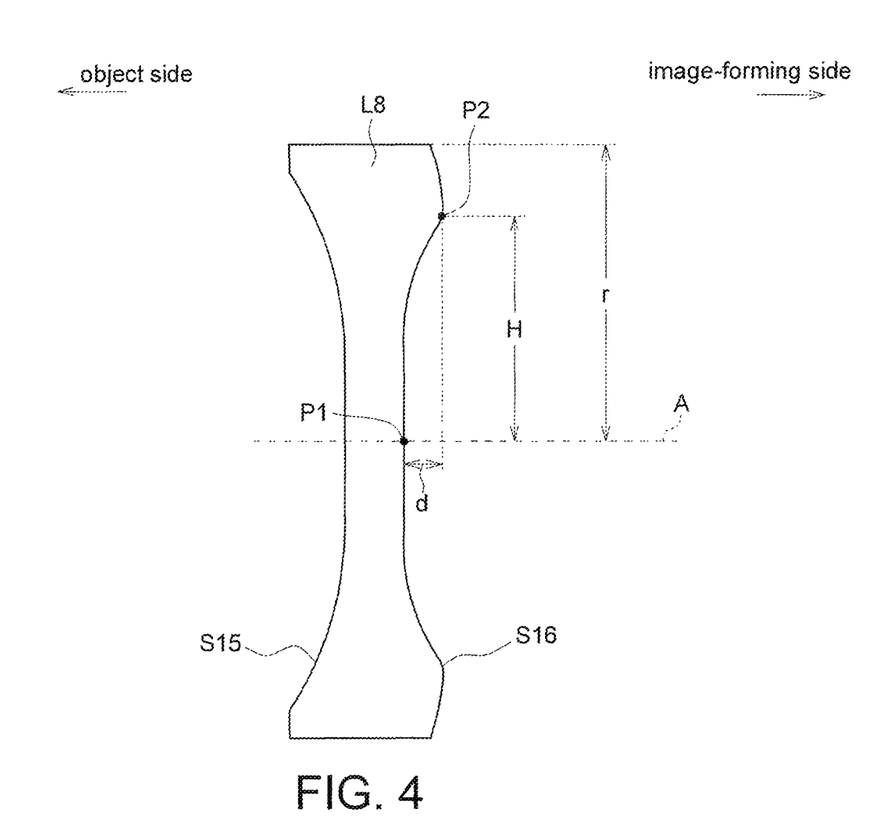
FIG. 4 shows an enlarged view of the eighth lens in FIG. 1.

FIG. 4 shows an enlarged view of the eighth lens L8 in FIG. 1. As shown in FIG. 4, the object-side surface S15 and the image-side surface S16 of the eighth lens L8 may both have positive refractive rate at the optical axis A, the object-side surface S15 may be substantially concave toward the image-forming side, and the image-side surface S16 may be substantially concave toward the object side. Further, the eighth lens L8 may be a lens having refractive power, the lens including but not limited to any one of a convex-concave or biconcave lens, glass or plastic lens, and a spherical or aspheric lens having positive refractive power or negative refractive power, or a combination thereof.

In one embodiment, R15 is a curvature radius of the object-side surface S15 of the eighth lens L8, R16 is a curvature radius of the image-side surface S16 of the eighth lens L8, and |(R15−R16)/(R15+R16)|≤15.

In addition, as shown in FIG. 4, the image-side surface S16 of the eighth lens L8 intersects with the optical A at an intersection point P1. The curvature radius of the image-side surface S16 gradually changes from positive refractive rate, at the center thereof, to negative refractive rate in a direction away from the optical axis. Thus, a vertex point P2 is formed on the image-side surface S16. That is, the vertex point P2 of the image-side surface S16 is a position on the image-side surface S16 closest to the imaging plane IMA. In one embodiment, H is a distance between the vertex point P2 and the optical axis A, r is an effective radius of the image-side surface S16, and |r/H|≤2. Furthermore, in another embodiment, the vertex point P2 projects on the optical axis A at a projection location P3, d is a distance between the projection location P3 and the intersection point P1, and |r/d|≤30.

Thus, the first lens group G1 consisting of the first lens L1, the second lens L2 and the third lens L3 may contribute to a wide field of view FOV of the optical lens 100; the second lens group G2 consisting of the fourth lens L4, the fifth lens L5, the sixth lens L6, the seventh lens L7 and the eighth lens L8 may contribute to low distortion and high resolution of the optical lens 100.

In one embodiment, the optical lens 100 may further include a stop STO and an optical plate OF. An image capturing unit (not shown) may be further disposed on the imaging plane IMA for photo-electrically converting light beams passing through the optical lens 100. The stop STO may control the amount of incident light and the relative angle between the incident light passing through the stop STO and the optical axis A, so that the lens size can be effectively shortened. The stop STO may be arranged between the third lens L3 and the fourth lens L4, but it is not limited thereto. The stop STO may also be arranged on the object side of the first lens L1, in any intervals between any two lenses, or between the eighth lens L8 and the imaging plane IMA. The optical plate OF may be an IR filter, a transparent protection glass, or other film structure which can achieve a particular optical effect. In another embodiment, the optical plate OF may be realized by two lenses and achieve substantially the same effect.

In one embodiment, the stop STO is arranged between the first lens group G1 and the second lens group G2, and the stop STO may control the relative angle between the light passing through the first lens group G1 and the optical axis A. That is, adjusting the aperture of the stop STO may control the image size on the imaging plane IMA. Furthermore, since the light beams passing through the stop STO may be restricted to a certain range, the effective diameter of the second lens group G2 may be smaller than the effective diameter of the first lens group G1, thereby effectively reducing the overall volume of the optical lens 100. Moreover, the aberration problem of the optical lens 100 may be further improved by using more lenses having aspheric surfaces as the second lens group G2.

As stated above, the optical lens provided by the present invention features low distortion, large aperture size and field of view, compact volume and low cost.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An optical lens, in order from an object side to an image-forming side, comprising:
    a first lens having negative refractive power;
    a second lens having negative refractive power;
    a third lens having positive refractive power;
    a fourth lens having positive refractive power;
    a fifth lens having negative refractive power;
    a sixth lens having positive refractive power;
    a seventh lens having positive refractive power; and
    an eighth lens having negative refractive power and comprising an image-side surface with a vertex point, wherein r is an effective radius of the image-side surface, the image-side surface intersects with an optical axis of the optical lens at an intersection point, H is a distance between the vertex point and the optical axis, the vertex point projects on the optical axis at a projection location, d is a distance between the projection location and the intersection point, and $|r/d| \leq 30$ and/or $|r/H| \leq 2$.

2. The optical lens according to claim 1, wherein the optical lens satisfies at least one of the following conditions:
    the first lens, the second lens and the third lens have positive refractive power as a whole; and
    the fourth lens, the fifth lens, the sixth lens, the seventh lens and the eighth lens have positive refractive power as a whole.

3. The optical lens according to claim 1, wherein the optical lens satisfies at least one of the following conditions:
    the first lens has an object-side surface and an image-side surface, R1 is a curvature radius of the object-side surface, R2 is a curvature radius of the image-side surface, and $|R1/R2| \geq 1$.

4. The optical lens according to claim 1, wherein the optical lens satisfies at least one of the following conditions:
    the first lens is a spherical lens;
    the first lens is a glass lens;
    at least one of the second lens, the third lens, the fourth lens, the fifth lens, the sixth lens, the seventh lens and the eighth lens is an aspheric lens or a free-form lens; and
    at least one of the second lens, the third lens, the fourth lens, the fifth lens, the sixth lens, the seventh lens and the eighth lens is a plastic lens or a glass lens.

5. The optical lens according to claim 1, wherein the optical lens satisfies at least one of the following conditions:
    the first lens is a convex-concave lens, the second lens is a concave lens, the third lens is a biconvex lens, the fourth lens is a biconvex lens, the fifth lens is a biconcave lens, the sixth lens is a biconvex lens, the seventh lens is a biconvex lens, and the eighth lens is a convex-concave lens or a biconcave lens.

6. The optical lens according to claim 1, wherein F is a focal length of the optical lens, TTL is a total length of the optical lens, Y is an image height of the optical lens, FNO is F-number of the optical lens, FOV is a field of view of the optical lens, D is a distance between an image-side surface of the third lens and an object-side surface of the fourth lens, and the optical lens satisfies at least one of the following conditions: $F/TTL \leq 0.5$, $F/Y \leq 1$, $0 \leq (FNO*TTL)/(FOV*Y)$, $(FNO*TTL)/(FOV*Y) \leq 0.3$ and $1 \leq |F/D|$.

7. The optical lens according to claim 1, wherein the first lens has a refractive index N1 and an Abbe number V1, the second lens has a refractive index N2 and an Abbe number V2, the third lens has a refractive index N3 and an Abbe number V3, the fourth lens has a refractive index N4 and an Abbe number V4, the fifth lens has a refractive index N5 and an Abbe number V5, the sixth lens has a refractive index N6 and an Abbe number V6, the seventh lens has a refractive index N7 and an Abbe number V7, the eighth lens has a refractive index N8 and an Abbe number V8, and the optical lens satisfies at least one of the following conditions: $N1 \geq N2$, $N1 \geq N4$, $N1 \geq N5$, $N1 \geq N6$, $N1 \geq N7$, $N1 \geq N8$, $N3 \geq N2$, $V2 \geq V1$, $V2 \geq V3$, $V4 \geq V1$, $V6 \geq V1$, $V7 \geq V1$, $V3 \geq V5$ and $V3 \geq V8$.

8. An optical lens, in order from an object side to an image-forming side, comprising:
    a first lens having negative refractive power and comprising an object-side surface and an image-side surface, wherein R1 is a curvature radius of the object-side surface, R2 is a curvature radius of the image-side surface, and $|R1/R2| \geq 1$;
    a second lens having negative refractive power;
    a third lens having positive refractive power;
    a fourth lens having positive refractive power;
    a fifth lens having negative refractive power;
    a sixth lens having positive refractive power;
    a seventh lens having positive refractive power; and an eighth lens having refractive power and comprising an image-side surface with a vertex point, wherein r is an effective radius of the image-side surface of the eighth lens, the image-side surface of the eighth lens intersects with an optical axis of the optical lens at an intersection point, the vertex point projects on the optical axis at a projection location, d is a distance between the projection location and the intersection point, and $|r/d| \leq 30$.

9. The optical lens according to claim 8, wherein the optical lens satisfies at least one of the following conditions:
the first lens, the second lens and the third lens have positive refractive power as a whole;
the fourth lens, the fifth lens, the sixth lens, the seventh lens and the eighth lens have positive refractive power as a whole; and
the eighth lens has negative refractive power.

10. The optical lens according to claim 8, wherein H is a distance between the vertex point and the optical axis, and $|r/H| \leq 2$.

11. The optical lens according to claim 8, wherein the optical lens satisfies at least one of the following conditions:
the first lens is a spherical lens;
at least one of the second lens, the third lens, the fourth lens, the fifth lens, the sixth lens, the seventh lens and the eighth lens is an aspheric lens or a free-form lens;
the first lens is a glass lens; and
at least one of the second lens, the third lens, the fourth lens, the fifth lens, the sixth lens, the seventh lens and the eighth lens is a plastic lens or a glass lens.

12. The optical lens according to claim 8, wherein the optical lens satisfies at least one of the following conditions: the first lens is a convex-concave lens, the second lens is a concave lens, the third lens is a biconvex lens, the fourth lens is a biconvex lens, the fifth lens is a biconcave lens, the sixth lens is a biconvex lens, the seventh lens is a biconvex lens, and the eighth lens is a convex-concave lens or a biconcave lens.

13. The optical lens according to claim 8, wherein F is a focal length of the optical lens, TTL is a total length of the optical lens, Y is an image height of the optical lens, FNO is F-number of the optical lens, FOV is a field of view of the optical lens, D is a distance between an image-side surface of the third lens and an object-side surface of the fourth lens, and the optical lens satisfies at least one of the following conditions: $F/TTL \leq 0.5$, $F/Y \leq 1$, $0 \leq (FNO*TTL)/(FOV*Y)$, $(FNO*TTL)/(FOV*Y) \leq 0.3$ and $1 \leq |F/D|$.

14. The optical lens according to claim 8, wherein the first lens has a refractive index N1 and an Abbe number V1, the second lens has a refractive index N2 and an Abbe number V2, the third lens has a refractive index N3 and an Abbe number V3, the fourth lens has a refractive index N4 and an Abbe number V4, the fifth lens has a refractive index N5 and an Abbe number V5, the sixth lens has a refractive index N6 and an Abbe number V6, the seventh lens has a refractive index N7 and an Abbe number V7, the eighth lens has a refractive index N8 and an Abbe number V8, and the optical lens satisfies at least one of the following conditions: $N1 \geq N2$, $N1 \geq N4$, $N1 \geq N5$, $N1 \geq N6$, $N1 \geq N7$, $N1 \geq N8$, $N3 \geq N2$, $V2 \geq V1$, $V2 \geq V3$, $V4 \geq V1$, $V6 \geq V1$, $V7 \geq V1$, $V3 \geq V5$ and $V3 \geq V8$.

15. An optical lens having an optical axis, the optical lens, in order from an object side to an image-forming side, comprising:
a first lens having negative refractive power;
a second lens having negative refractive power;
a third lens having positive refractive power;
a fourth lens having positive refractive power;
a fifth lens having negative refractive power;
a sixth lens having positive refractive power;
a seventh lens having positive refractive power; and
an eighth lens comprising an image-side surface with a vertex point, wherein r is an effective radius of the image-side surface, the image-side surface intersects with the optical axis at an intersection point, H is a distance between the vertex point and the optical axis, the vertex point projects on the optical axis at a projection location, d is a distance between the projection location and the intersection point, and $|r/d| \leq 30$ and $|r/H| \leq 2$.

16. The optical lens according to claim 15, wherein the optical lens satisfies at least one of the following conditions:
the first lens, the second lens and the third lens have positive refractive power as a whole;
the fourth lens, the fifth lens, the sixth lens, the seventh lens and the eighth lens have positive refractive power as a whole; and
the eighth lens has negative refractive power.

17. The optical lens according to claim 15, wherein the optical lens satisfies at least one of the following conditions:
the first lens is a spherical lens;
the first lens is a glass lens;
at least one of the second lens, the third lens, the fourth lens, the fifth lens, the sixth lens, the seventh lens and the eighth lens is an aspheric lens or a free-form lens; and
at least one of the second lens, the third lens, the fourth lens, the fifth lens, the sixth lens, the seventh lens and the eighth lens is a plastic lens or a glass lens.

18. The optical lens according to claim 15, wherein the optical lens satisfies at least one of the following conditions: the first lens is a convex-concave lens, the second lens is a concave lens, the third lens is a biconvex lens, the fourth lens is a biconvex lens, the fifth lens is a biconcave lens, the sixth lens is a biconvex lens, the seventh lens is a biconvex lens, and the eighth lens is a convex-concave lens or a biconcave lens.

19. The optical lens according to claim 15, wherein F is a focal length of the optical lens, TTL is a total length of the optical lens, Y is an image height of the optical lens, FNO is F-number of the optical lens, FOV is a field of view of the optical lens, D is a distance between an image-side surface of the third lens and an object-side surface of the fourth lens, and the optical lens satisfies at least one of the following conditions: $F/TTL \leq 0.5$, $F/Y \leq 1$, $0 \leq (FNO*TTL)/(FOV*Y)$, $(FNO*TTL)/(FOV*Y) \leq 0.3$ and $1 \leq |F/D|$.

20. The optical lens according to claim 15, wherein the first lens has a refractive index N1 and an Abbe number V1, the second lens has a refractive index N2 and an Abbe number V2, the third lens has a refractive index N3 and an Abbe number V3, the fourth lens has a refractive index N4 and an Abbe number V4, the fifth lens has a refractive index N5 and an Abbe number V5, the sixth lens has a refractive index N6 and an Abbe number V6, the seventh lens has a refractive index N7 and an Abbe number V7, the eighth lens has a refractive index N8 and an Abbe number V8, and the optical lens satisfies at least one of the following conditions: $N1 \geq N2$, $N1 \geq N4$, $N1 \geq N5$, $N1 \geq N6$, $N1 \geq N7$, $N1 \geq N8$, $N3 \geq N2$, $V2 \geq V1$, $V2 \geq V3$, $V4 \geq V1$, $V6 \geq V1$, $V7 \geq V1$, $V3 \geq V5$ and $V3 \geq V8$.

* * * * *